(12) United States Patent
Shiu (10) Patent No.: US 7,418,722 B2
(45) Date of Patent: Aug. 26, 2008

(54) ELECTRICAL SYSTEM WITH AN IMPROVED EJECTING MECHANISM

(75) Inventor: Guo Jiun Shiu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 691 days.

(21) Appl. No.: 11/025,805

(22) Filed: Dec. 28, 2004

(65) Prior Publication Data
US 2005/0193402 A1 Sep. 1, 2005

(30) Foreign Application Priority Data
Feb. 26, 2004 (CN) .................... 2004 2 0025034 U (51) Int. Cl.
*G11B 17/04* (2006.01)
*H01B 13/62* (2006.01)
(52) U.S. Cl. ............... 720/636; 439/159; 360/99.06
(58) Field of Classification Search .......... 439/155, 439/157, 159; 720/636; 360/99.06
See application file for complete search history.

(56) References Cited

U.S. PATENT DOCUMENTS

| | | |
|---|---|---|
| 4,656,542 A | 4/1987 | Shibata |
| 5,558,527 A | 9/1996 | Lin |
| 5,575,669 A | 11/1996 | Lin et al. |
| 5,825,616 A * | 10/1998 | Howell et al. ............... 361/684 |
| 6,033,243 A | 3/2000 | Kajiura |
| 6,036,510 A * | 3/2000 | Ono et al. ................... 439/157 |
| 6,059,589 A * | 5/2000 | Nishioka .................... 439/159 |
| 6,071,135 A * | 6/2000 | Obara ........................ 439/159 |
| 6,095,835 A * | 8/2000 | Oguchi ...................... 439/159 |
| 6,123,560 A * | 9/2000 | Hara et al. .................. 439/159 |
| 6,875,034 B1 * | 4/2005 | Su et al. ..................... 439/159 |
| 7,108,525 B2 * | 9/2006 | Hisatomi .................... 439/159 |
| 2002/0137378 A1 * | 9/2002 | Kuroda ....................... 439/159 |
| 2004/0067668 A1 * | 4/2004 | Hirata et al. ................ 439/159 |

* cited by examiner

*Primary Examiner*—Brian E Miller
(74) *Attorney, Agent, or Firm*—Wei Te Chung (57) ABSTRACT

An electrical system comprises a module (3), an immovable element (2) defining a space for receiving the module and an ejecting mechanism assembled between the immovable element and the module. The ejecting mechanism comprises a guiding frame (6), a groove frame (5) and a first spring element (7) for urging the module to withdraw out of the immovable element. The guiding frame comprises a swing element (63) being rotatable around a pivot pin thereof and a second spring element (62) attached to the swing element. The swing element defines a guiding pin and a balance line. The groove frame defines a continuous groove for guiding the guiding pin. The second spring element can prevent the guiding pin from being moved along a direction opposite to a predetermined direction.

14 Claims, 10 Drawing Sheets

ELECTRICAL SYSTEM WITH AN IMPROVED EJECTING MECHANISM

BACKGROUND OF THE INVENTION

1. Field of the Invention

The present invention relates to an electrical system, and particularly to an electrical system having an ejecting mechanism.

2. Description of Related Art

Conventionally, a disk drive apparatus such as a floppy disk driver, a CD (Compact Disc) driver as an external memory of a computer has an ejecting device for ejecting a disk. The ejecting device has a holder for positioning a floppy disk to a drive position. This holder is pivotally mounted on a base of a floppy disk drive device and can be interlocked with a door disposed to freely close/open a floppy disk insertion port of the drive device. The holder has a clamper. While the door is closed, the holder is held at the first position. In this position, the damper of the holder cooperates with a spindle mounted on the base to clamp the floppy disk. When the door is opened, the holder is pivoted to the second position to separate the damper from the spindle. When the floppy disk is inserted through the insertion hole and is placed on the spindle, and the door is closed, the holder is pivoted to the first position, so that the floppy disk is clamped between the spindle and the damper and is placed in the driven position. However, the loading/ejecting device of the disk drive apparatus is too complicated to manufacture. Hence, a disk drive apparatus with a simple loading/ejecting device is desired.

U.S. Pat. No. 5,558,527 disclose another ejecting mechanism equipped on a card connector in which even with the PC card mounted therein, a push button for the withdrawal of the PC card is retained in the same position as it is in a not-mounted state; and the push button is projected only when the PC card is withdrawn.

The ejecting mechanism basically includes an operation rod having a push button at an outer end section and spring-urged outwardly, a drive rod for driving a PC card withdrawal plate through a lever, an intermediate member driven under an action of a cam and allowing a connection or disconnection to be made between an outer operation rod and an inner drive rod, and a casing for slidably guiding the operation rod and the drive rod. A substantially heart-like cam groove is formed in the bottom wall of the casing with its projecting end side outward and the recessed side inward. The cam groove is formed as a continuous groove configuration, and comprises a drive section, a latching section, and a curved return section which extends from the latching section. A cam follower pin projected from the operation rod is moved in the cam groove along the given direction together with the movement of the push rod. An inclination section is provided at a transition area from the drive section to the latching section and at a transition area from the return section to the drive section so as to prevent the cam follower pin from being moved in a direction opposite to the given direction.

However, the ejecting mechanism disclosed in U.S. Pat. No. 5,558,527 provided in the electrical connector comprises a number of elements cooperated with each other to eject the electrical card, thereby complicating the configuration of the electrical card connector and increasing the difficulty of manufacture. Furthermore, the inclination section is required to be provided in the cam groove, thereby increasing the molded difficulty of the earn groove.

Hence, an improved ejecting mechanism is desired to overcome the disadvantage of the prior art.

SUMMARY OF THE INVENTION

An object of the present invention is to provide an electrical system having an improved ejecting mechanism.

To achieve the above object, An electrical system comprises a module, an immovable element defining a space for receiving the module and an ejecting mechanism assembled between the immovable element and the module. The ejecting mechanism comprises a guiding frame, a groove frame and a first spring element for urging the module to withdraw out of the immovable element. The guiding frame comprises a swing element being ratatable around a pivot pin thereof and a second spring element attached to the swing element. The swing element defines a guiding pin and a balance line. The groove frame defines a continuous groove for guiding the guiding pin. The second spring element can prevent the guiding pin from being moved along a direction opposite to a predetermined direction.

Other objects, advantages and novel features of the invention will become more apparent from the following detailed description when taken in conjunction with the accompanying drawings.

DETAILED DESCRIPTION OF THE INVENTION

Figure 1:
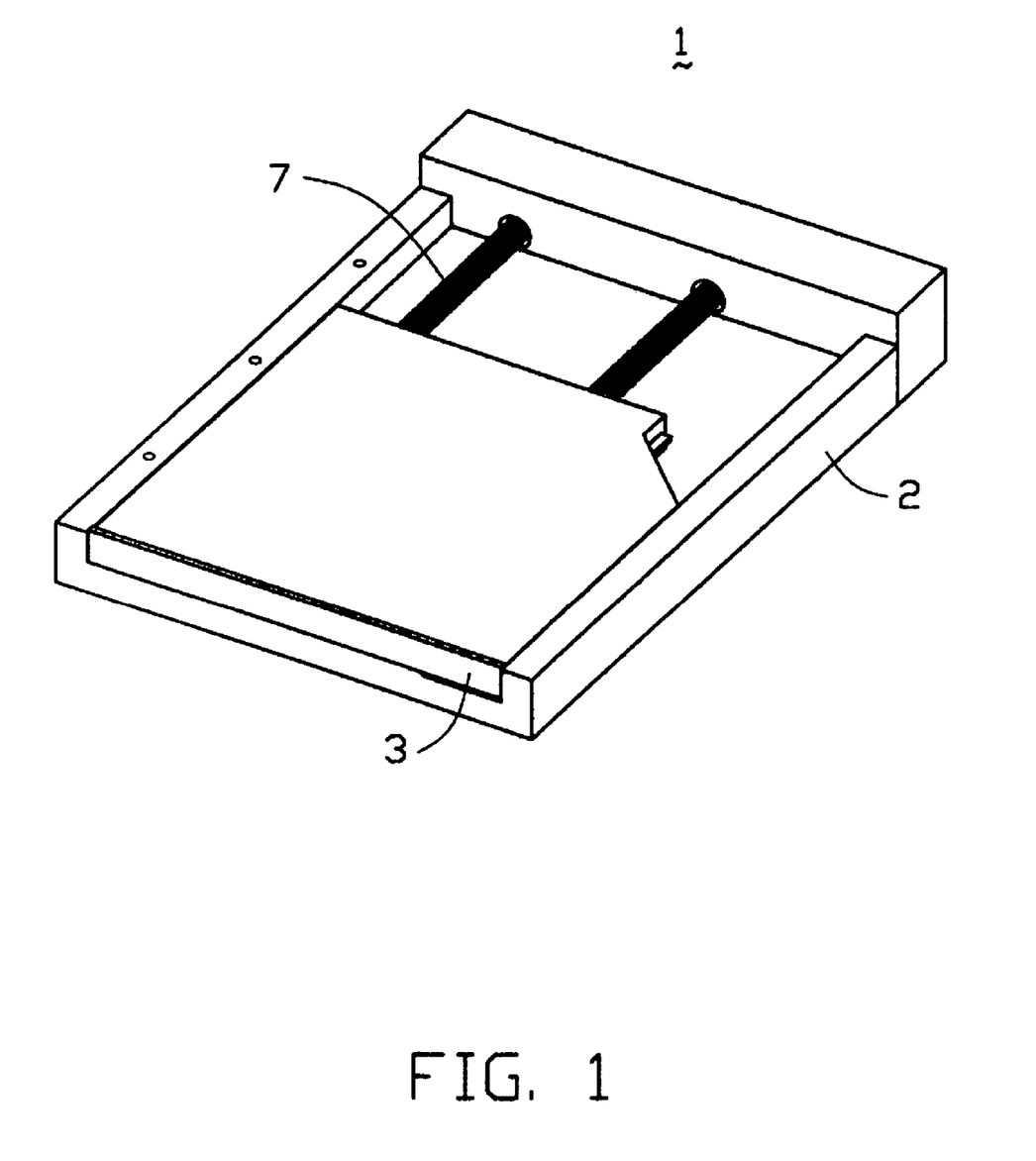
FIG. 1 is an assembled perspective schematic view of an electrical system in accordance with the present invention.
Figure 2:
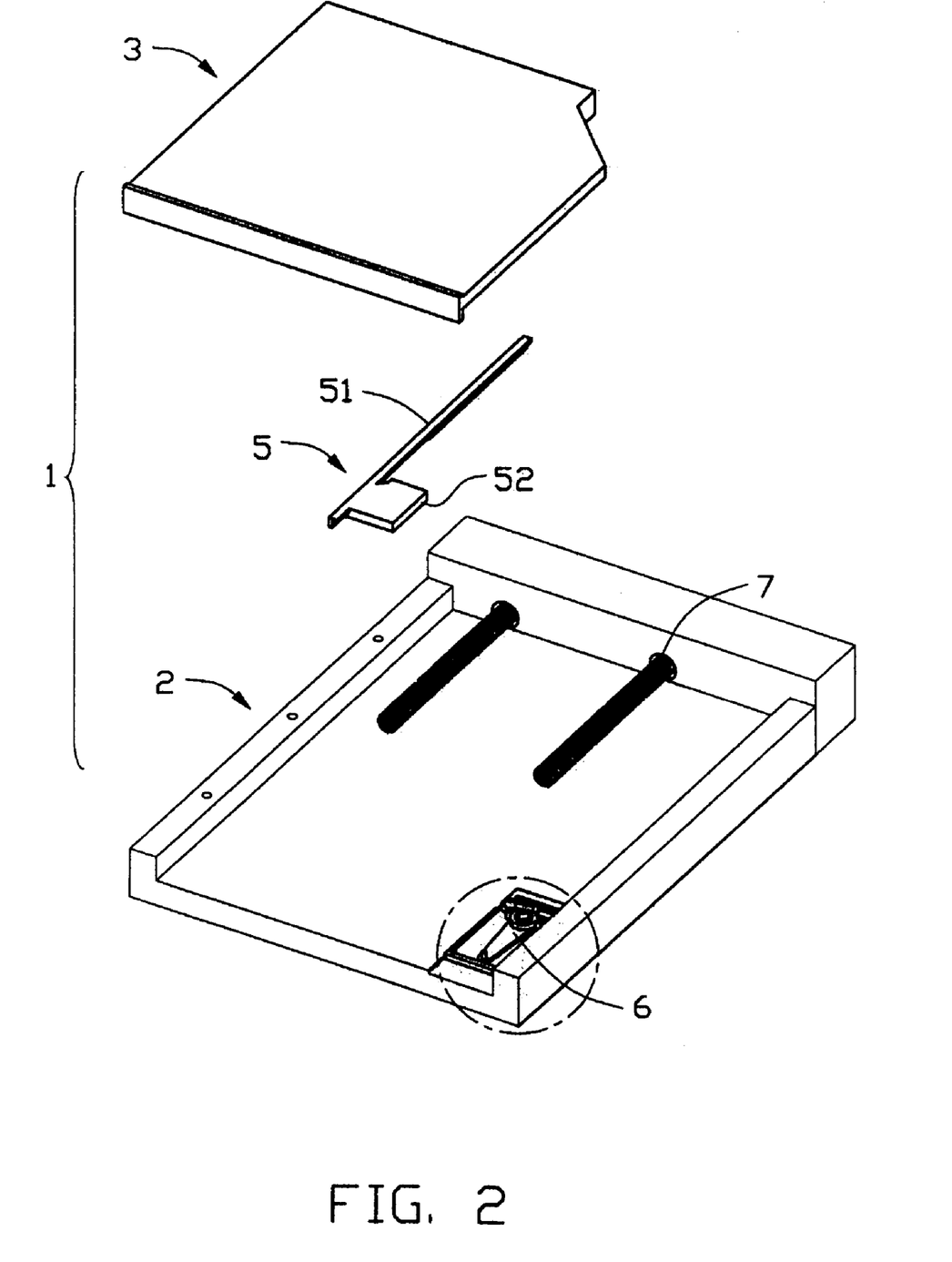
FIG. 2 is an exploded perspective view of the electrical system shown in FIG. 1.

Referring to FIGS. 1 and 2, an electrical system 1 in accordance with the present invention comprises an immovable element 2, such as a floppy disk drive or a CD driver et al., and a module 3, such as a floppy disk or a CD, received in a cavity 20 defined in the immovable element 2. The immovable element 2 is adapted for establishing a signal transmission path between the module 3 and an electrical equipment, such as a mother board of a computer. The immovable element 2 and the module 3 are schematically shown in the FIGS. of the present invention for simplicity.

Referring to FIGS. 1-5, the electrical system 1 further comprises an ejecting mechanism equipped between the immovable element 2 and the module 3. The mechanism comprises a guiding frame 6, a groove frame 5 and a first spring element 7. In the present embodiment, the groove frame 5 is attached to the module 3 and the guiding frame 6 is attached to the immovable element 2. It is should be noted that the groove frame 5 can be attached to the immovable element 2 and the guiding frame 6 can be attached to the module 3 in other embodiments. The first spring element 7 is attached to the immovable element 2 for urging the module 3 out of the cavity 20.

Figure 4:
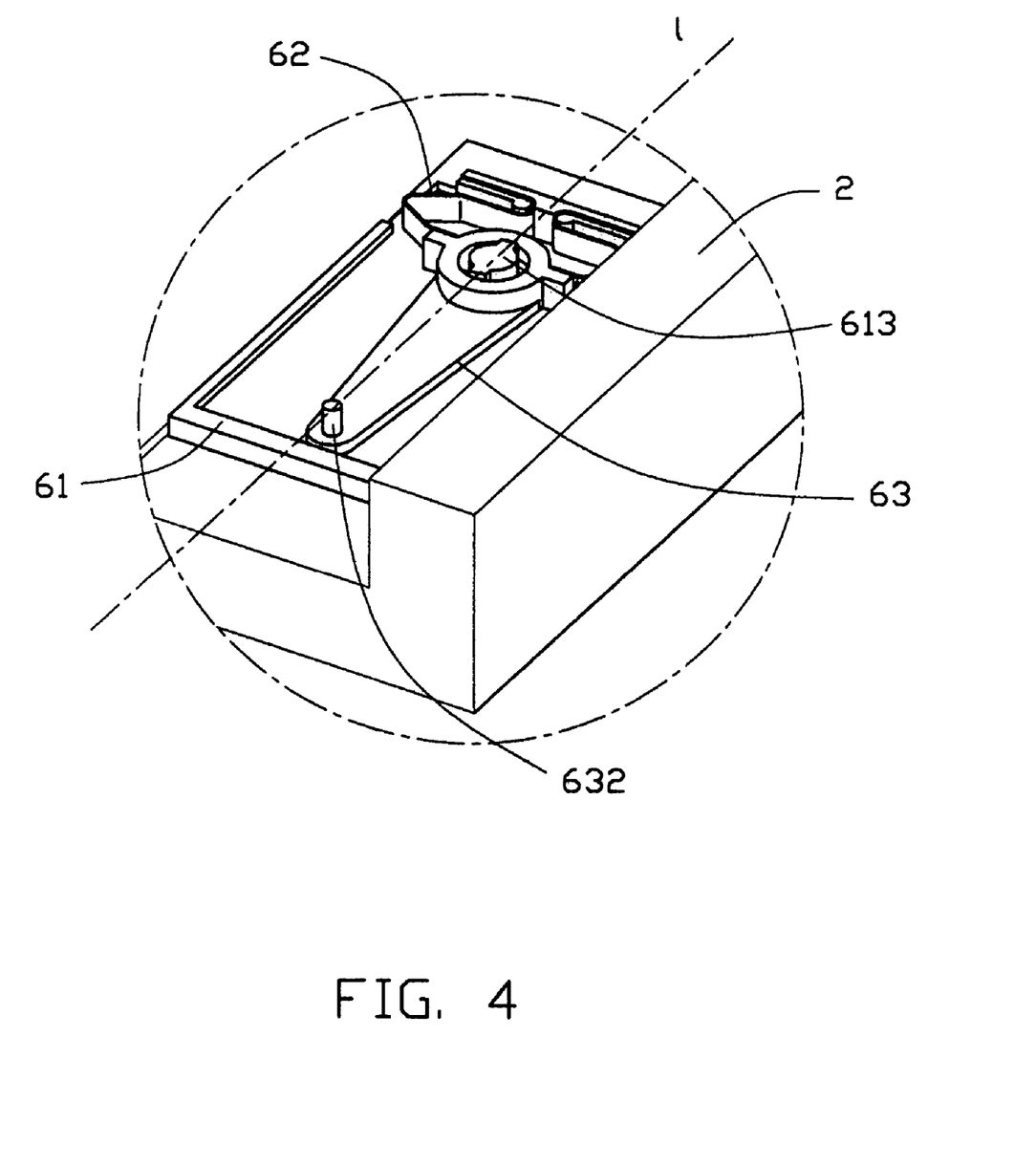
FIG. 4 is a partially fragmentary view of an immovable element of the electrical system shown in FIG. 2.
Figure 5:
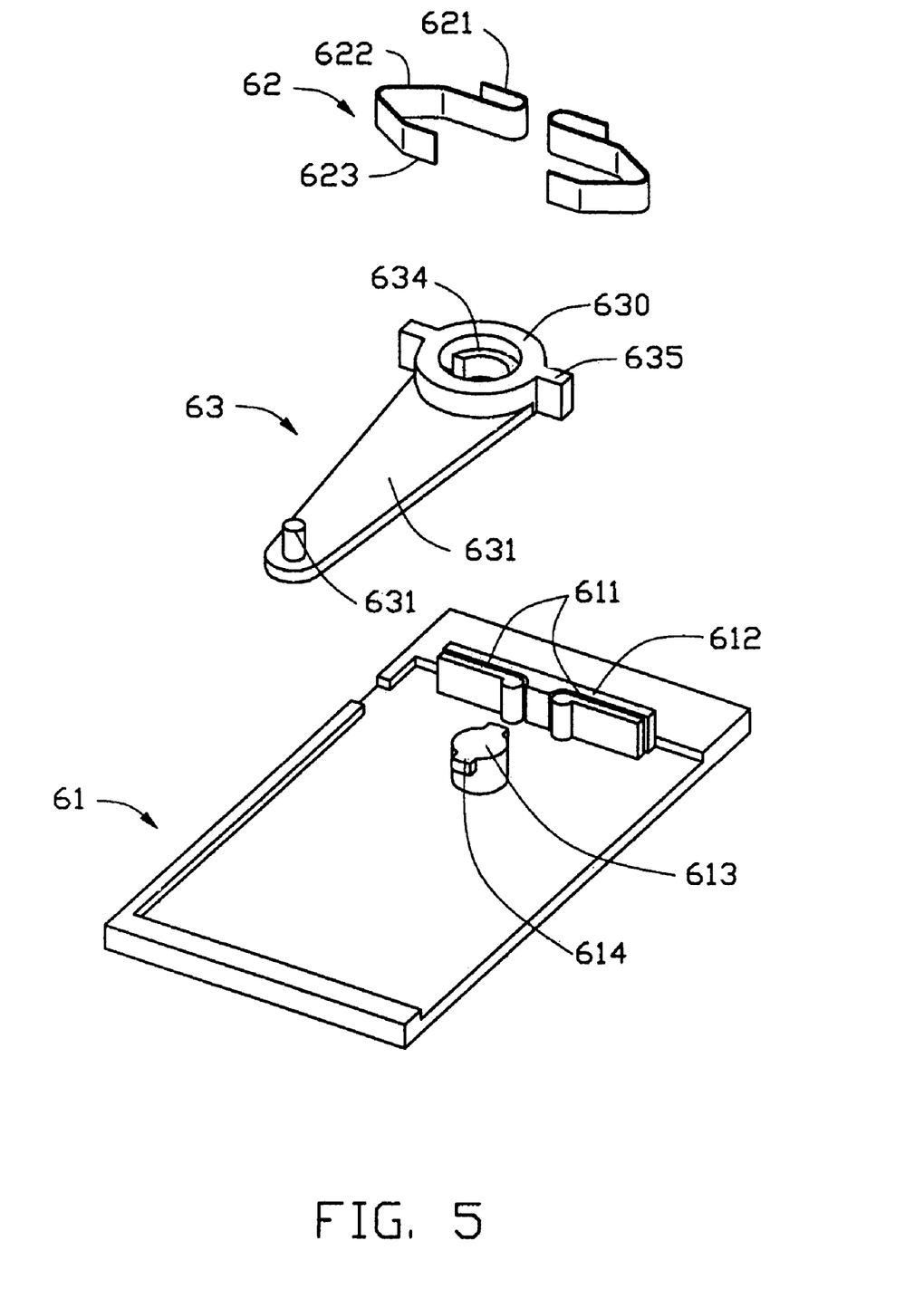
FIG. 5 is an explode view of a guiding frame of the immovable element shown in FIG. 4.

Referring to FIGS. 2, 4 and 5, the guiding frame 6 comprises a plate 61 securely assembled on a corner of the immovable element 2 and a swing element 63 attached on the plate 61. The plate 61 is formed with a pivot pin 613 perpendicularly extending from the middle portion thereof. The pivot pin 613 is formed with a pair of opposite stoppers 614 at a free end thereof. The swing element 63 comprises a pivot base 630, a pivot arm 631 extending from the base 630 and a guiding pin 632 formed at a distal of the pivot arm 631. The pivot base 630 defines a pivot hole 633 passing therethrough and is formed with a pair of spaced projections 634 oppositely projecting into the pivot hole 633. The swing element 63 is assembled onto the plate 61 with the pivot pin 613 rotatably received in the pivot hole 633. Simultaneously, the stoppers 614 are located above the projections 634 to prevent the swing element 63 from disengaging from the plate 61.

The plate 61 is formed with a protrusion 612 spaced from the pivot pin 613. A pair of slits 611 aligned with each other, are defined in the protrusion 612. The guiding frame 6 further comprises a second spring element, such as a pair of resilient pieces 62 stamped from metallic plate. Each resilient piece 62 has a pair of distal ends 621, 623 thereof and an a curved and resilient interim section 622 between the distal ends 621 and 622. Each resilient piece 62 is assembled to the plate 61 with one distal end 621 retained in corresponding slit 611 and the other distal end 623 attached to one of a pair of extensions 635, which is formed at opposite ends of the base 630 of the swing elements 63 As best shown in FIG. 4, in a normal state, the swing element 63 is located in a balance position and the guiding pin 632 defines a balance line l together with pivot pin 613 It should be noted that the spring pieces 62 will drive the swing element 63 to resume the balance position due to inherent characteristic of the spring pieces 62 when the swing element 63 offsets from the balance position.

Figure 3:
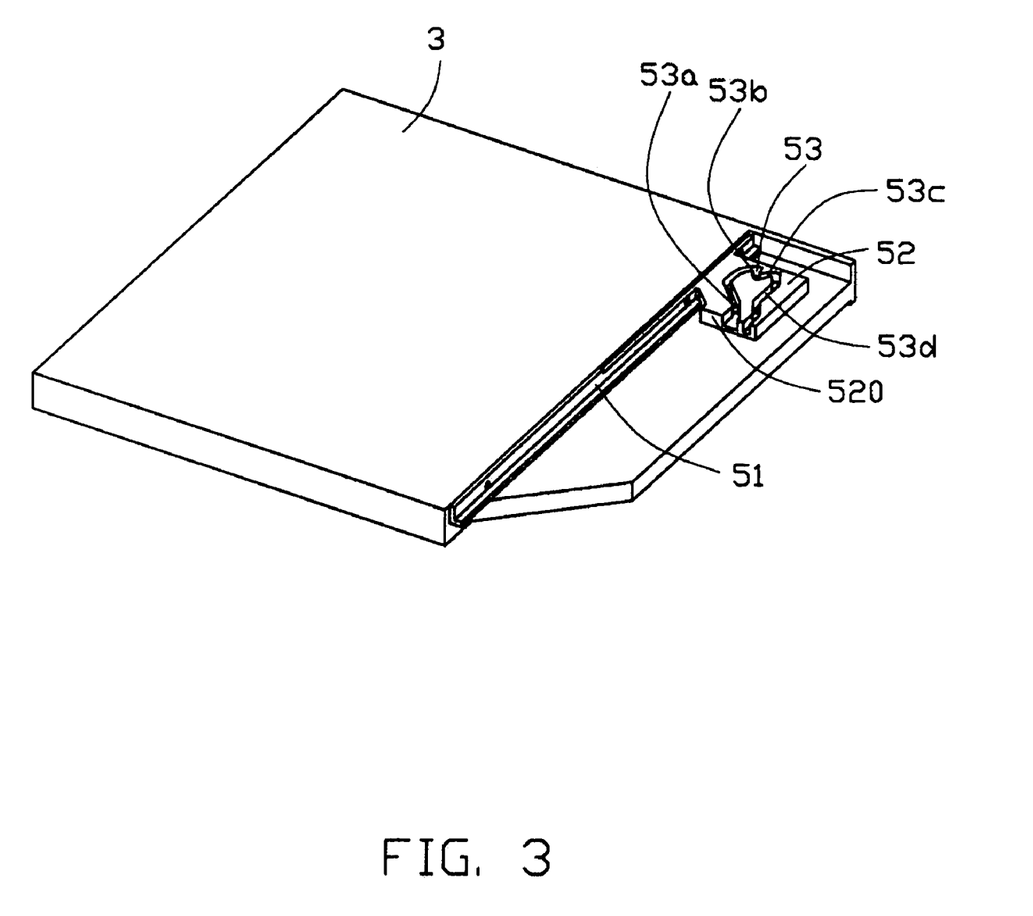
FIG. 3 is a bottom perspective view of a module of the electrical system shown in FIG. 2.

Referring to FIGS. 2 and 3, the groove frame 5 comprises an elongated beam 51 securely attached to one side of the module 3, a groove plate 52 having a rear edge 520 and a continuous groove 53 defined in the groove plate 52 and shaped as 「M」. In conjunction with FIG. 6A, the continuous groove 53 comprises a first drive section 53a which curvedly extends away from the rear edge 520 of the groove plate 52 and the balance line l, a first return section 53b which extends from the first drive section 53a toward the rear edge 520 and the balance line l, a second drive section 53c which extends from the first return section 53b toward the balance line l and away from the rear edge 520, and a second return section 53d which curvedly extends from the second drive section 53c toward the rear edge 520 of the groove plate 52. The first drive section 53a defines an entry A at the rear edge 520 and the second return section 53d defines an exit E spaced from the entry A at the rear edge 520. The groove 53 further defines a latching section C located between the first return section 53a and the second drive section 53c.

Referring to FIGS. 6A-6E, the following is a detailed explanation about the operation of the module 3 and the immovable element 2.

Figure 6A:
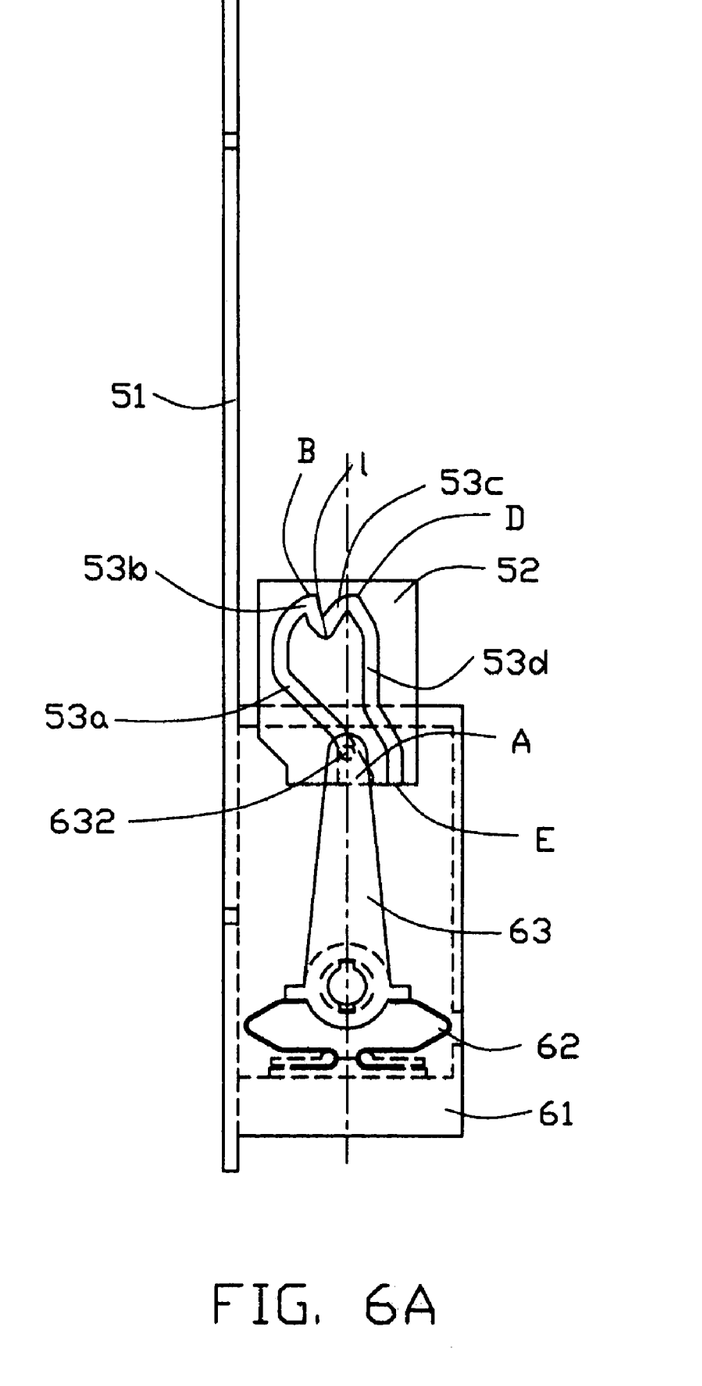
FIGS. 6A-6E are schematic views showing an operation process of an ejecting mechanism of the electrical system.

As best shown in FIG. 6A, before the module 3 is inserted into the immovable element 2, the guiding pin 632 of the swing element 63 is normally situated at the entry A of the groove 53. On the other hand, in this state the swing element 63 is located in the balance position. The first drive section 53a, the first return section 53b and the second drive section 53c are located at one side of the balance line l of the swing element 63.

Figure 6B:
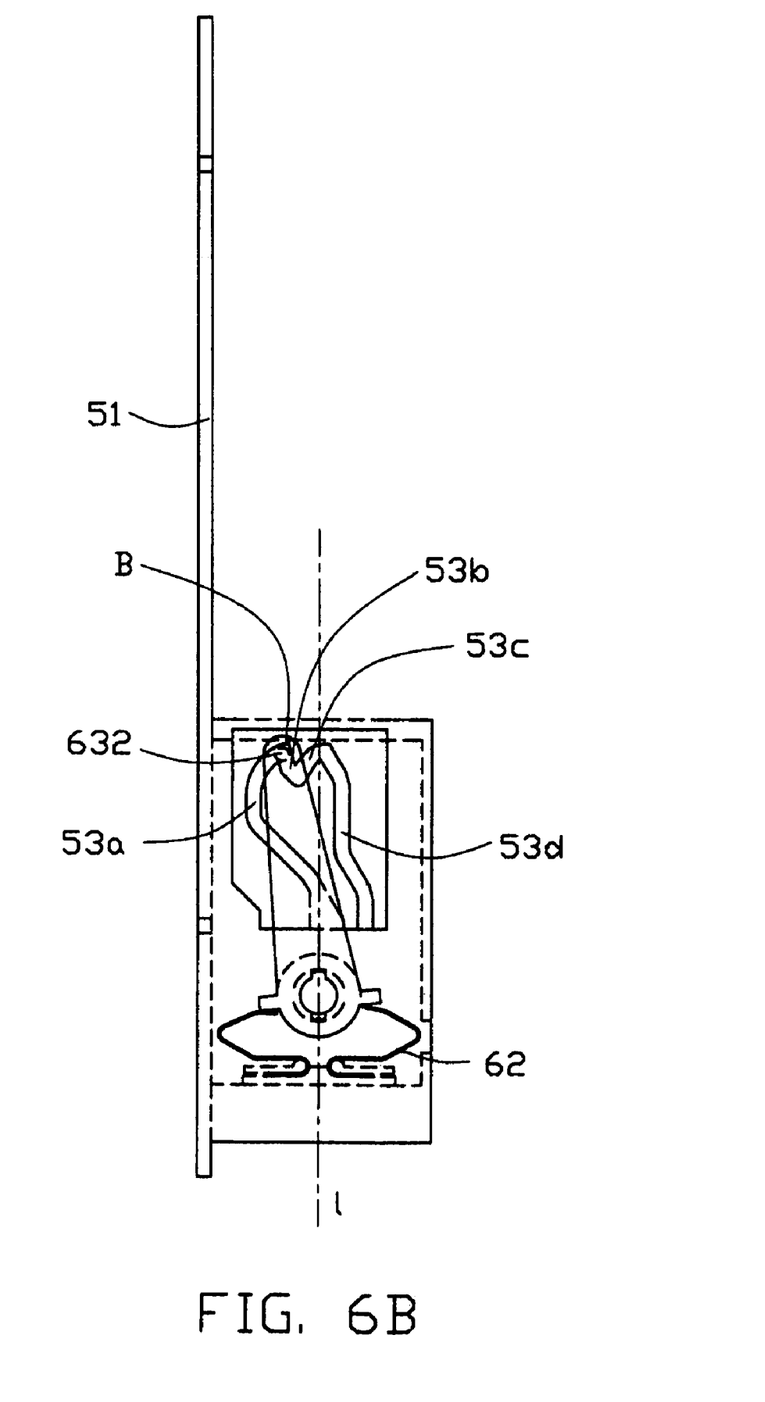

As best shown in FIG. 6B, when the module 3 in the state shown in FIG. 6A is slightly pushed in order to be inserted into the immovable element 2, the guiding pin 632 of the swing element 63 is guided along the first drive section 53a to a junction B, which is located between the first drive section 53a and the first return section 53b. In this state, the first spring element 7 is deformed along an inserting direction of the module 3 by a pushing force of the module 3. Simultaneously, the swing element 63 is rotated round the pivot pin 613 and offsets from the balance position with the spring pieces 632 deformed.

Figure 6C:
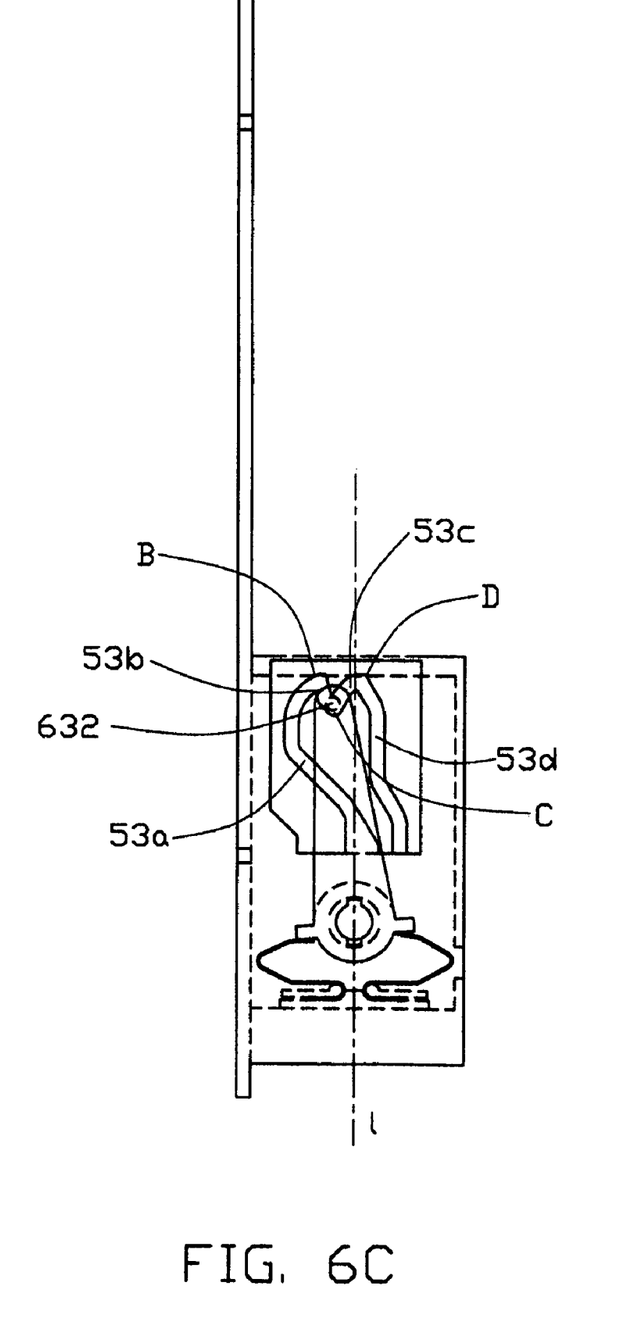

As best shown in FIG. 6C, when the push force of the module 3 is released in the state show shown in FIG. 6B, a composition of resilient forces of the first spring element 7 and the second spring element 62 urge the guiding pin 632 to move along the first return section 53b until the guiding pin arrives at the latching section C. The module 3 is thus completely inserted into the immovable element. It should be noted that the guiding pin 632 can only be guided along the first return second 53b and not return along the first drive section 53a due to driving of the resilient force of the second spring element 62.

Figure 6D:
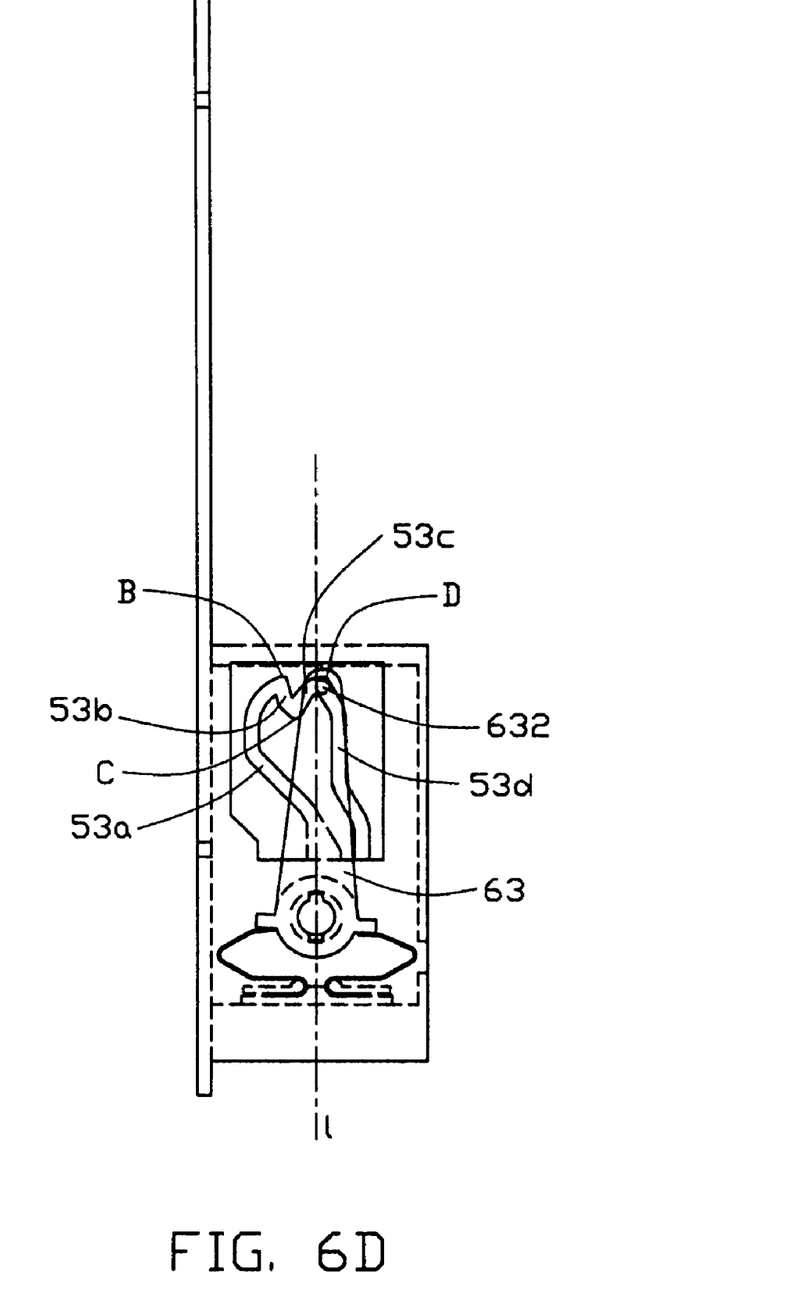

As best shown in FIG. 6D, when the module 3 in the state shown in FIG. 6C is slightly pushed in order to withdraw out of the immovable element 2, the guiding pin 632 of the swing element 63 is guided along the second drive 53c to a junction D, which is located between the second drive section 53c and the second return section 53d. It should be noted that the guiding pin 632 can only be guided along the second drive section 53c and not return, along the first return, section 53b due to driving of resilient force of the second spring element 62.

Figure 6E:
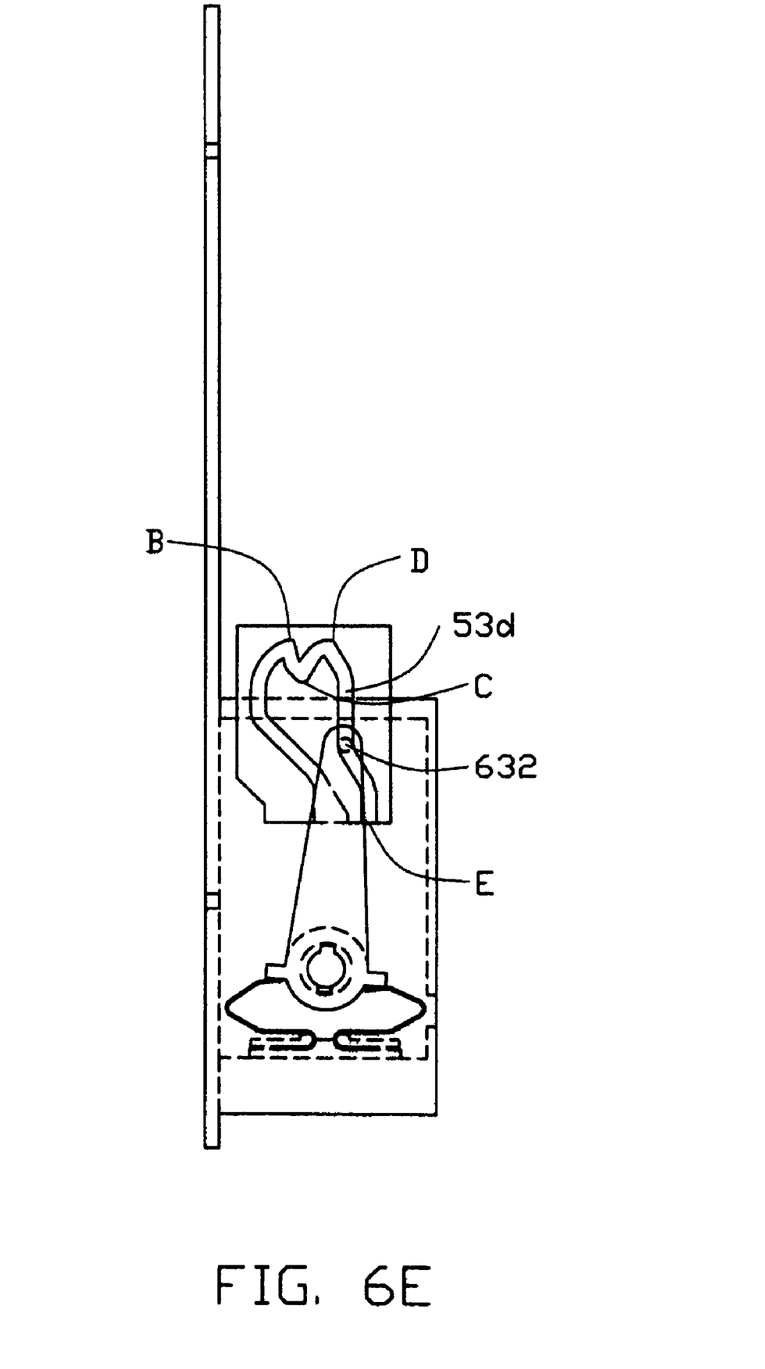

As best shown in FIG. 6E, when the push force to the module 3 in the state shown in FIG. 6D is released, the guiding pin 632 is driven by a composition of resilient force of the first spring element 7 and the second spring element 62 to move along the second return section 53d until out of the exit E, whereby the module 2 withdraws out of the immovable element 3. As described above, the second spring element 62 can prevent the guiding pin 632 from moving along a direction opposite to a predetermined direction of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical system, comprising:
  a module;
  an immovable element defining a cavity for receiving the module;
  an ejecting mechanism assembled between the immovable element and the module, and comprising a guiding frame, a groove frame and a first spring element for urging the module to withdraw out of the immovable element;
  the guiding frame of the ejecting mechanism comprising a swing element being rotatable around a pivot pin thereof and defining a guiding pin and a balance line, and a second spring element attached to the swing element for driving the swing element to come back when the element offsets from the balance line;
  the groove frame of the ejecting mechanism defining a continuous groove for guiding the guiding pin, the groove comprising thereof an entry located on the balance line, a first drive section extending from the entry and away from the balance line, a first return section extending from the first drive section toward the balance line, a second drive section extending from the first return section toward the balance line and a second return section extending from the second drive section, the groove defining a latching section between the first return section and the second drive section for locking the guiding pin, whereby the second spring element prevents the guiding pin from moving along a direction opposite to a predetermined direction.

2. The electrical system as claimed in claim 1, wherein the guiding frame and the first spring element are located on the immovable element, and wherein the groove frame is located on the module.

3. The electrical system as claimed in claim 2, wherein the guiding frame comprises a plate attached onto the immovable element, and wherein the pivot pin of the guiding frame is formed on the plate.

4. The electrical system as claimed in claim 3. wherein the swing element defines a pivot hole for receiving the pivot pin of the guiding pin.

5. The electrical system as claimed in claim 4, wherein the plate is formed with a protrusion defining a slit thereon, and wherein one end of the second spring element is received in the slit and the other end of the second spring element is attached to the swing element.

6. The electrical system as claimed in claim 2, wherein the groove frame comprises an elongated beam attached to the module and a groove plate where the groove is defined.

7. An electrical system, comprising:
a module;
an immovable element defining a cavity for receiving the module;
an ejecting mechanism assembled between the immovable element and the module, and comprising a guiding frame, a groove frame and a first spring element for urging the module to withdraw out of the immovable element, the guiding frame comprising a pivot pin and a swing element being rotatable around the pivot pin, the swing element being formed with a guiding pin, the groove frame defining a continuous groove comprising a drive section, a return section and a latching section between the drive section and the return section for locking the guiding pin, the guiding pin being guided in the continuous groove along a given direction; wherein
the guiding frame is attached to one of the immovable element and the module, and the guiding frame is attached to the other one of the immovable element and the module.

8. The electrical system as claimed in claim 7, wherein the guiding frame and the first spring element are attached onto the immovable element, and wherein the groove frame is attached onto the module.

9. An electrical connection system comprising;
an immovable element defining a cavity;
a module being moveable relative to the immovable element in opposite insertion/ejection directions;
an ejection mechanism including:
a guiding groove formed in one of said immovable element and said module, said guiding groove defining a locked position and a release position; and
a guiding pin formed on the other of said immoveable element and said module, said guiding pin being moveable along said guiding groove and capable of being retained in said locked position and being escaped from the guiding groove at the released position; wherein
said module is capable of not only being securely retained in a locked position when said module reached a final stage in said insertion direction, but also being completely removed and dropped from the immoveable element in said ejection direction when said module reaches another final stage in said ejection direction.

10. The system as claimed in claim 9, wherein said guiding groove defines an opening at leased position to allow the guiding pin to enter/leave in said insertion/ejection directions when said module is moved relative to the immoveable element in said insertion/ejection directions.

11. The system as claimed in claim 9, wherein said guiding groove is formed in the module and the guiding pin is formed on the immoveable element.

12. The system as claimed in claim 9, wherein said guiding pin is located on a swing clement.

13. The system as claimed in claim 9, further including a biasing device to push the module out of the immoveable element in the ejection direction.

14. The system as claimed in claim 12, further including a resilient device to urge the swing element to a position which is adapted to enter the guiding groove when the module is moved along the insertion direction under a condition that the guiding pin is moved from a non-engagement status to an engagement status with the guiding groove.

* * * * *